March 12, 1929.  W. B. GRUETER  1,704,970
GANG EDGER
Filed Sept. 11, 1925  2 Sheets-Sheet 1

INVENTOR.
WILLIAM B. GRUETER.
BY
Bottum, Hudnall, Liecher and McNamara.
ATTORNEYS.

March 12, 1929. W. B. GRUETER 1,704,970
GANG EDGER
Filed Sept. 11, 1925 2 Sheets-Sheet 2
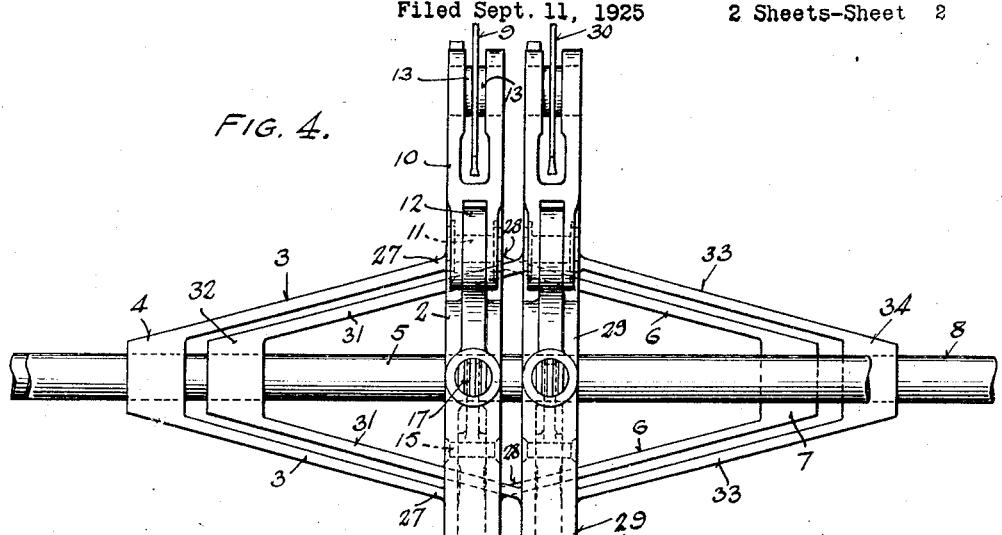
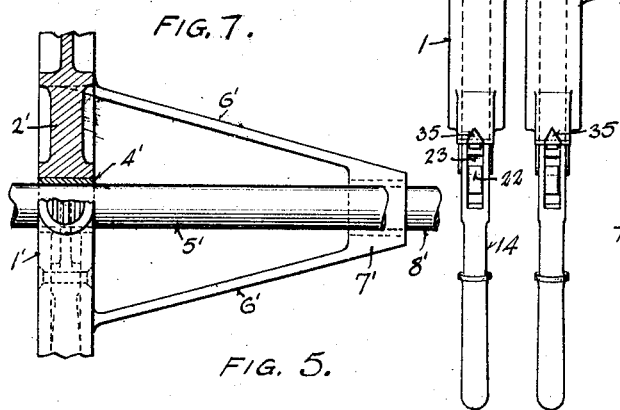
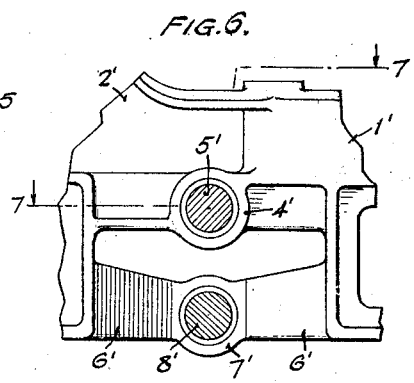
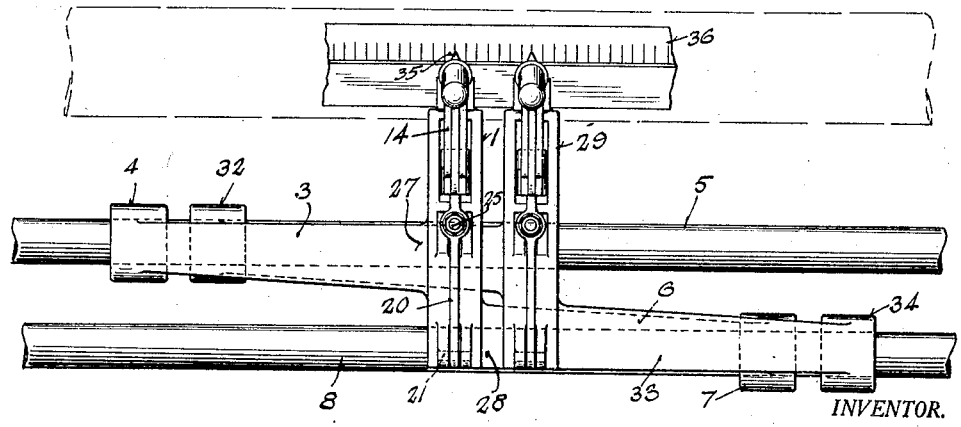
INVENTOR.
WILLIAM B. GRUETER
BY
Bottum, Hudnall, Secher and McNamara.
ATTORNEYS.

Patented Mar. 12, 1929.

1,704,970

UNITED STATES PATENT OFFICE.

WILLIAM B. GRUETER, OF MENOMINEE, MICHIGAN, ASSIGNOR TO THE PRESCOTT COMPANY, OF MENOMINEE, MICHIGAN, A CORPORATION OF MICHIGAN.

GANG EDGER.

Application filed September 11, 1925. Serial No. 55,672.

This invention relates to gang edgers, and more particularly to the construction of the saw-shifting members therefor.

A gang edger comprises, in general, a number of circular saws splined on an arbor for rotation therewith and sliding movement along the same to various positions depending upon the width to which the lumber is to be cut, a member slidably mounted on rods or guiding elements parallel to the arbor, each member being provided with a bracket which embraces the edge of the saw and holds lignum vitæ lugs which engage the saw at either side thereof whereby the latter may be shifted along the arbor upon movement of the saw-shifting member, and live rolls arranged to feed the lumber through the saws. The saw-shifting members of some edgers are moved back and forth to the desired positions by power, while in other edgers the saw-shifting members are manually operated. In the latter type of edger, the saw-shifting members are often moved with considerable difficulty due to binding action of the latter on the guiding elements or rods therefor caused by slight tilting movement of the saw-shifting member when the saw offers any great amount of resistance to its being shifted along the arbor. Some types of saw-shifting members have been constructed with a view toward making them so rigid that there will be no tilting movement thereof with respect to the guiding elements or rods and consequently no binding action on the latter. These saw-shifting members constructed heretofore, however, have not entirely eliminated this trouble for the reason that they have not sufficient rigidity to entirely eliminate tilting or rotary movement with respect to the guiding elements, it requiring only a very slight tilting movement of the member to cause binding thereof on the guiding elements. One of the objects of the present invention, therefore, is to provide an improved saw-shifting member of the character referred to which has sufficient rigidity to eliminate all tendency of the same to tilt and bind upon the guiding rods or elements therefor.

Another object is to provide improved saw-shifting members of the character referred to which interfit or nest together to permit movement of the saws close together which are simple in construction, durable, and which may be cast in one piece.

Other objects and advantages will hereinafter appear.

For the purpose of illustrating the invention an embodiment thereof is shown in the drawings, in which Figure 1 is a transverse, sectional view through an edger;

Fig. 4 is a plan view of Fig. 1;

Fig. 5 is an end elevation, looking toward the left in Fig. 1;

Fig. 6 is a fragmentary view of a modified form; and

Fig. 7 is a section on line 7—7 of Fig. 6.

Figure 1:
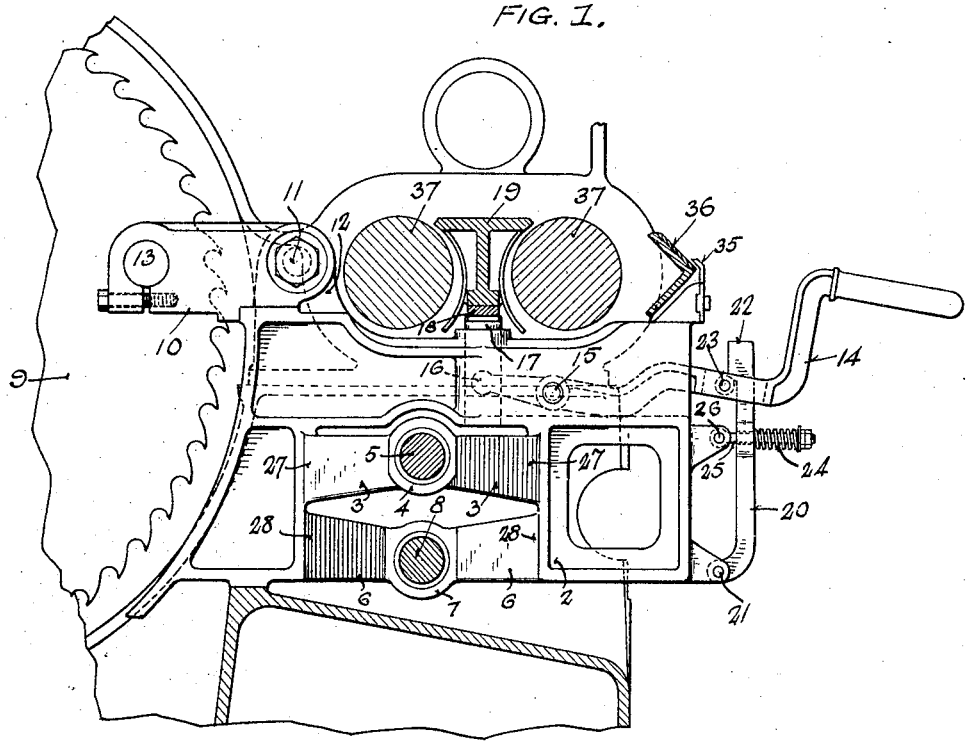

The saw-shifting member 1 comprises, in general, a body portion 2 having a pair of outwardly converging arms 3 extending from one side thereof and having their outer adjacent ends formed to provide a collar 4 which receives and loosely fits about or embraces the rod or guiding element 5, and a second pair of outwardly converging arms 6 extending from the other side of body portion 2 and having their outer adjacent ends formed to provide a collar 7 which receives and loosely fits about or embraces the rod or guiding element 8 arranged below and in parallel relation to rod 5, the rods or guiding elements 5 and 8 being parallel to the usual arbor (not shown) upon which the saw 9 is splined for rotation therewith and sliding movement along the same. A bracket 10 fits over the edge of saw 9, as more clearly shown in Fig. 4, and is pivotally connected by means of a bolt 11 to a lug 12 which may be formed or cast integrally with member 1, lignum vitæ lugs 13 being held in position by bracket 10 to engage either side of the saw whereby the latter is shifted along the arbor upon sliding movement of the saw-shifting member along the rods or guiding elements 5 and 8.

The means for holding member 1 and saw 9 in adjusted position may comprise a manually operable lever 14 pivotally connected at 15 to body portion 2 of member 1 and having its free end 16 arranged to actuate a suitable latch 17 loosely mounted for vertical movement in body portion 2, the upper end of the latch being provided with teeth adapted to engage a toothed rack 18 secured to the underside of the cross member 19. When lever 14 is in the position thereof shown in Fig. 1, latch 17 is in interlocking engagement with rack 18 and the saw-shifting member 1 locked against sliding movement along rods 5 and 8, lever 14 being held in this position by any suitable means such as a member 20 pivotally connected at 21 to body portion 2 and having its upper end 22 formed to fit over a roller 23 carried by lever 14, member 20 being held in the position shown by means of a spring 24 arranged upon a bolt 25 which extends loosely through lever 20 and is pivotally connected at 26 to body portion 2. When the sawyer desires to change the position of saw 9 along the arbor, he raises lever 14 to move latch 17 downward out of interlocking engagement with rack 18, during which movement of lever 14 roller 23 forces the upper end 22 of member 20 to the right and compresses spring 24, and then slides member 1 along rods 5 and 8 to the desired position. When the saw has been adjusted, lever 14 is returned to the position thereof shown in Fig. 1, at which time the upper end 22 of member 20 snaps over roller 23 under the action of spring 24 and holds latch 17 in interlocking engagement with rack 18. The means just described for holding saw 9 and the saw-shifting member 1 in adjusted position forms no part of the present invention and has only been shown and described for the purpose of showing one way of locking the improved saw-shifting member in adjusted position, but of course any other suitable means may be employed for this purpose.

Figure 2:
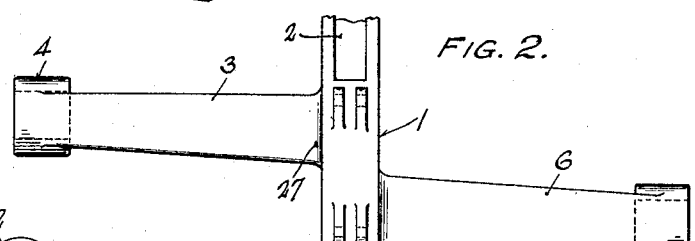
Fig. 2 is a fragmentary view, looking toward the left in Fig. 1.
Figure 3:
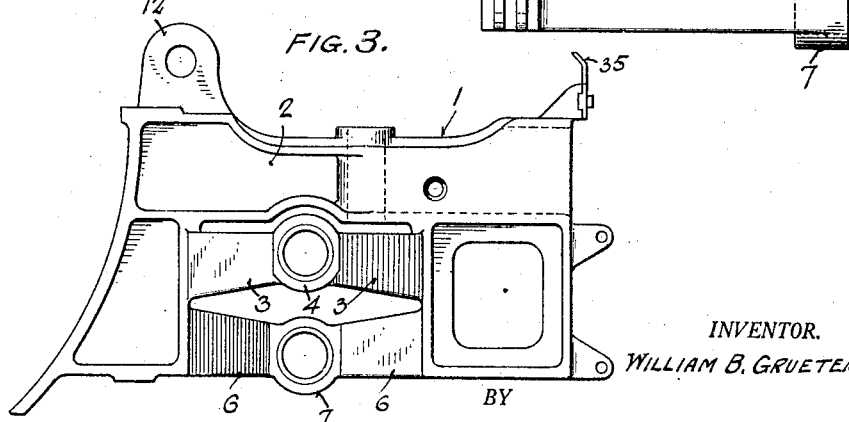
Fig. 3 is a front elevation of the improved saw-shifting member.

The ends 27 of arms 3 and the ends 28 of arms 6 are secured to opposite sides of body portion 2 of member 1 at equal distances on either side of rods 5 and 8 whereby the arms 3 and 6 form a parallelogram or four-sided frame rigidly secured to body portion 2 of the saw-shifting member, as shown in Fig. 4, the collars 4 and 7 at opposite corners of the parallelogram being offset in one direction with respect to each other, as shown in Figs. 2 and 5, to receive rods 5 and 8. The four-sided frame formed by arms 3 and 6 holds body portion 2 of saw-shifting member 1 in position at right angles to or transverse to rods 5 and 8 and provides a rigid structure which entirely eliminates any tilting or rotary movement of body portion 2 in a horizontal plane with respect to rods 5 and 8, thus preventing any possible binding action of collars 4 and 7 upon the rods when saw 9 offers resistance against movement along the arbor therefor.

The saw-shifting member 29 for saw 30 is identical in construction to the member 1 for saw 9 described above, and is provided on one side thereof with outwardly converging arms 31 which extend through body portion 2 of member 1 and nest with arms 3 of the latter upon movement of members 29 and 1 close together, as shown in Fig. 4, the outer ends of arms 31 being formed to provide a collar 32 which receives and fits loosely about rod 5. As shown in Fig. 4, the outwardly converging arms 33 of member 29 also nest with arms 6 of member 1 and have their outer ends formed to provide a collar 34 which receives and fits loosely about rod 8.

From the foregoing it will be seen that an improved saw-shifting member for gang edgers has been provided which is rigidly constructed and which will not bind upon the rods or guiding elements 5 and 8 therefor when any great resistance is offered by saw 9 against movement along the arbor, and that an improved saw-shifting member has been provided which is simple in construction and which permits movement of the saws close together.

The saw-shifting members 1 and 29 may be provided with the usual pointers 35 arranged to move over a graduated scale 36 to indicate to the sawyer the position of the saws upon the arbor. The lumber is carried through the saw by means of the usual live rolls 37.

Although the construction of the improved saw-shifting member just described represents a preferred embodiment of the invention, of course various changes may be made without departing from the spirit of the invention or the scope of the claims. For instance, one of the arms 3 or 6 may be eliminated, the necessary rigidity of member 1 being obtained by the bracing action of either of the pair of arms 3 and 6, in which case there will be one pair of outwardly converging arms extending from one side of body portion 2 of the saw-shifting member and only one arm extending outwardly from the other side of body portion 2.

As shown in Figs. 6 and 7, the collar 4' is formed or cast integrally in body portion 2' of member 1', while the outwardly converging arms 6' are identical to arms 6 described above and provide the collar 7' which receives and loosely fits the guiding element or rod 8', collar 4' receiving and loosely fitting about the guiding element or rod 5', as shown. In the modified form shown in Figs. 6 and 7, therefore, one pair of the outwardly converging arms in Figs.

1 to 5 is omitted, the collar formed by the outer ends of these arms being formed in the body of the shifting member. Although the distance between collars 4' and 7' along rods 5' and 8' would be one-half that between collars 4 and 7 in Figs. 1 to 5, the distance between collars 4' and 7' is sufficient to prevent any tilting or rotary movement of body portion 2' with respect to rods 5' and 8' and to thereby eliminate binding action of member 1' on the rods, arms 6' providing for the necessary rigidity.

The invention claimed is:

1. In a gang edger, a pair of guide elements arranged in parallel spaced relation with respect to each other, and a saw-shifting member provided on one side thereof with a pair of outwardly converging arms having their adjacent outer ends formed to embrace one of said elements, said member being provided on the other side thereof with a second pair of outwardly converging arms having their adjacent outer ends formed to embrace the other of said elements, said arms permitting movement of said member with respect to said elements in a direction parallel to the latter and being adapted and arranged for coaction with the same to hold said member against rotary movement.

2. In a gang edger, a pair of guide elements arranged in parallel spaced relation with respect to each other, and a saw-shifting member comprising a body portion arranged transversely of said elements, a pair of outwardly converging arms extending from one side of said body portion and having their adjacent outer ends formed to provide a collar for receiving one of said elements, and a second pair of outwardly converging arms extending from the other side of said body portion and having their adjacent outer ends formed to provide a collar for receiving the other of said elements, said arms permitting said member to slide along said elements and acting to hold said body portion in a position transverse to the latter.

3. In a gang edger, a pair of guide elements arranged in parallel spaced relation with respect to each other, and a plurality of saw-shifting members each comprising a body portion arranged transversely of said elements, a pair of outwardly converging arms extending from one side of said body portion and having their adjacent outer ends formed to fit loosely about one of said elements, and a second pair of outwardly converging arms extending from the other side of said body portion and having their adjacent outer ends formed to fit loosely about the other of said elements, said arms coacting with said elements to hold said body portion against rotary movement with respect thereto, the arms of each of said members being adapted and arranged to nest with the respective arms of an adjacent member.

4. A saw-shifting member of the character described comprising a body portion, a pair of outwardly converging arms extending from one side of said body portion and having their adjacent outer ends formed to provide a collar for receiving a guiding element, a second pair of outwardly converging arms extending from the other side of said body portion and having their adjacent ends formed to provide a second collar for receiving a second guiding element.

5. A saw-shifting member of the character described comprising a body portion and a four-sided frame rigidly secured thereto, opposite corners of said frame being offset in two directions with respect to each other, said offset opposite corners being provided with means adapted for sliding engagement with guiding means.

6. A saw-shifting member of the character described comprising a body portion, a pair of outwardly converging arms extending from one side thereof and having their adjacent outer ends formed for sliding engagement with a guiding element and a second guiding means associated with the body portion and exerting its guiding action at points spaced from the ends of the arms.

7. In a gang edger, a guiding element, a saw-shifting member comprising a body portion, a plurality of arms extending outwardly from one side of the latter and secured to the same at points on opposite sides of said element, said arms converging outwardly and having their outer adjacent ends united and formed for sliding engagement with said element and a second guiding means associated with the body portion and exerting its guiding action at points spaced from the ends of the arms.

8. A saw-shifting member of the character described comprising a body portion and a supporting frame secured thereto, the members comprising said frame forming a parallelogram and providing collars offset in two directions with respect to each other and adapted to receive guiding elements.

9. In a gang edger, a pair of parallel guiding elements, and saw-shifting members slidably mounted on said elements and each comprising a body portion and a four-sided frame rigidly secured thereto and having opposite corners offset in two directions with respect to each other and formed to provide collars fitting loosely around said elements whereby said body portion is held in position at right angles to the latter, the members comprising said frame being secured to said body portion on opposite sides of said elements and arranged to nest with the respective members of an adjacent saw-shifting member.

10. A saw-shifting member of the character described comprising a body portion, a pair of outwardly converging arms extending from one side thereof and having means at their adjacent outer ends adapted for sliding engagement with opposed portions of a guiding element, and means connected to the body portion and independent of and spaced from said arms and said aforementioned means and also adapted for sliding engagement with a guiding element.

In witness whereof I hereto affix my signature.

WILLIAM B. GRUETER.